(12) United States Patent
Bloebaum et al.

(10) Patent No.: US 7,707,073 B2
(45) Date of Patent: Apr. 27, 2010

(54) SYSTEMS METHODS AND COMPUTER PROGRAM PRODUCTS FOR PROVIDING AUGMENTED SHOPPING INFORMATION

(75) Inventors: L. Scott Bloebaum, Cary, NC (US); Melissa Rutledge, Mebane, NC (US)

(73) Assignee: Sony Ericsson Mobile Communications, AB, Lund (SE)

( * ) Notice: Subject to any disclaimer, the term of this patent is extended or adjusted under 35 U.S.C. 154(b) by 0 days.

(21) Appl. No.: 12/121,034

(22) Filed: May 15, 2008

(65) Prior Publication Data
US 2009/0287587 A1 Nov. 19, 2009

(51) Int. Cl.
*G06F 17/60* (2006.01)
(52) U.S. Cl. ......................................... 705/26; 705/27
(58) Field of Classification Search .................. 705/26, 705/27
See application file for complete search history.

(56) References Cited

U.S. PATENT DOCUMENTS

| | | | | |
|---|---|---|---|---|
| 6,381,583 | B1* | 4/2002 | Kenney | 705/26 |
| 6,595,417 | B2* | 7/2003 | O'Hagan et al. | 235/383 |
| 6,604,681 | B1* | 8/2003 | Burke et al. | 235/383 |
| 7,263,500 | B2* | 8/2007 | Deal | 705/26 |
| 2001/0044751 | A1* | 11/2001 | Pugliese et al. | 705/26 |
| 2002/0178013 | A1* | 11/2002 | Hoffman et al. | 705/1 |
| 2005/0256781 | A1* | 11/2005 | Sands et al. | 705/26 |
| 2006/0283941 | A1* | 12/2006 | Singer-Harter | 235/383 |
| 2007/0250707 | A1* | 10/2007 | Noguchi | 713/164 |

OTHER PUBLICATIONS

Innovations Abound (published by Chain Store Age; Oct. 2007; 83,10 ABI/INFORM Global p. 14A.*

* cited by examiner

*Primary Examiner*—Jason B Dunham
*Assistant Examiner*—Courtney Stopp
(74) *Attorney, Agent, or Firm*—Myers Bigel Sibley & Sajovec (57) ABSTRACT

Methods for providing augmented shopping information to a user of a mobile terminal in a store include providing a shopping list identifying a plurality of items and obtaining information regarding physical locations of respective ones of the items in the store. The location of the mobile terminal in the store is established. An image of a view from the location is obtained. An item having an associated location in the obtained image is identified based on the obtained information regarding physical locations. A position within the image corresponding to the respective physical location of the identified item is determined. A graphic indication of the identified item is added to the obtained image at the determined position within the image to provide an augmented image of the view that is displayed to the user on a display of the mobile terminal.

21 Claims, 3 Drawing Sheets

SYSTEMS METHODS AND COMPUTER PROGRAM PRODUCTS FOR PROVIDING AUGMENTED SHOPPING INFORMATION

BACKGROUND

The present invention relates to electronic devices and, more particularly, to electronic devices, methods and computer program products for use when shopping.

The use of electronic devices, such as computers and other processor based devices continues to expand. In particular, many users carry wireless mobile terminals, such as cellular telephones, with them routinely during their daily routines. Increasingly, these devices are "smart" devices, with high quality displays, cameras, extensive memory and application execution capability. Furthermore, these devices not only support voice communications but also have extensive data communications capabilities using various protocols, such as the Internet Protocol (IP).

There has been an increasing amount of interest in various forms of Virtual Reality (VR) recently. In its purest form, VR involves interaction among participants in a purely virtual world such as Linden Labs' Second Life. However, there exists a continuum between VR and pure real-world experience where various mixtures of real and virtual elements make up the user's experience. Augmented Reality (AR) is one point whereby the user's real-world experience or perception is enhanced by virtual elements.

SUMMARY

In some embodiments of the present invention, methods for providing augmented shopping information to a user of a mobile terminal in a store include providing a shopping list identifying a plurality of items and obtaining information regarding physical locations of respective ones of the items in the store. The location of the mobile terminal in the store is established. An image of a view from the location is obtained. At least one of the items having an associated location in the obtained image is identified based on the obtained information regarding physical locations. A position within the image corresponding to the respective physical location of the identified at least one of the items is determined. A graphic indication of the identified at least one of the items is added to the obtained image at the determined position within the image to provide an augmented image of the view. The augmented image of the view is displayed to the user on a display of the mobile terminal.

In other embodiments, establishing the location includes receiving an input from the user designating the location and/or receiving data from a known physical location wireless transmitter within the store. Establishing the location may include receiving the data from the known physical location wireless transmitter within the store and the known physical location wireless transmitter may be a near field communication (NFC) transmitter.

In further embodiments, establishing the location includes receiving the data from the known physical location wireless transmitter within the store and the known physical location wireless transmitter includes a plurality of wireless local area network transmitters. Establishing the location includes determining the location based on triangulation using signals received from the plurality of wireless local area network transmitters. Establishing the location may further include establishing an orientation of the mobile terminal based on a magnetic sensor within the mobile terminal.

In other embodiments, establishing the location includes receiving an input from the user designating the location. The input includes a designation of the obtained image as the view from the location. Establishing the location includes detecting an element in the obtained image and establishing the location based on the detected element.

In further embodiments, the image is a video image and obtaining the image includes obtaining a sequence of images to provide the video image. Identifying at least one of the items having an associated location in the obtained image, determining the position within the image, adding the graphic indication and displaying the augmented image are repeatedly performed for respective ones of the sequence of images responsive to detecting a change in the view from the location.

In yet other embodiments, obtaining information further includes obtaining supplemental information regarding the respective ones of the items in the store. Adding the graphic indication includes modifying the graphic indication based on the supplemental information. The supplemental information may include pricing information associated with the respective items and modifying the graphic indication may include including the pricing information in the graphic indication. Obtaining information may further include obtaining an identification and physical location of a substitute item for at least one of the items that has an associated location in the obtained image and including a graphic indication of the identified substitute item in the augmented image at a position in the image corresponding to the physical location of the substitute item.

In further embodiments, obtaining information regarding physical locations includes establishing a communication connection between the mobile terminal and a store inventory server. The shopping list is provided to the store inventory server using the established communication connection. The information is obtained from the store inventory server responsive to providing the shopping list to the store inventory server.

In other embodiments, a user profile for the store for the user is provided. Establishing a location includes establishing the location based on the user profile. Obtaining information may include obtaining supplemental information regarding the respective ones of the items in the store based on the user profile.

In further embodiments, a change in orientation of the mobile terminal to a specified orientation is detected. An overhead view is displayed of a layout of the store on the display of the mobile terminal responsive to detection of the change in orientation of the mobile terminal.

In other embodiments, displaying the augmented image is preceded by obtaining a selection from the user of a subset of the items. Adding a graphic indication includes adding a graphic indication only for ones of the selected subset of the items having an associated location in the obtained image.

In yet further embodiments, wireless mobile terminals are provided including a shopping list identifying a plurality of items desired by a user and a wireless communication circuit configured to obtain information regarding physical locations of items in a store. The mobile terminal further includes a camera configured to obtain an image of a view from a location of the mobile terminal and a location determination module configured to establish a location of the mobile terminal in the store. A shopping aide module is provided that is configured to identifying at least one of the items on the shopping list having an associated location in the obtained image based on the obtained information regarding physical locations, to determine a position within the image corresponding to the respective physical location of the identified at least one of the items and to add a graphic indication of the identified at least one of the items to the obtained image at the determined position within the image to provide an augmented image of the view. A display of the mobile terminal is configured to display the augmented image of the view to the user. The wireless communication circuit may also be configured to obtain supplemental information regarding the items in the store and the shopping aide module may also be configured to modify the graphic indication based on the supplemental information.

In some embodiments, computer program products for providing augmented shopping information to a user of a mobile terminal in a store are provided. The computer program product includes computer program code embodied in a computer readable medium. The computer program code includes program code configured to carry out one or more of the above described methods.

DETAILED DESCRIPTION OF EMBODIMENTS OF THE INVENTION

The present invention now will be described more fully with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the term "comprising" or "comprises" is open-ended, and includes one or more stated features, integers, elements, steps, components or functions but does not preclude the presence or addition of one or more other features, integers, elements, steps, components, functions or groups thereof.

As used herein, the term "and/or" includes any and all combinations of one or more of the associated listed items.

As used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Furthermore, "coupled" or "connected" as used herein may include wirelessly coupled or connected.

Well-known functions or constructions may not be described in detail for brevity and/or clarity.

The present invention may be embodied as methods, electronic devices, and/or computer program products. Accordingly, the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store or transport the program for use by or in connection with the instruction execution system, apparatus, or device.

Embodiments according to the present invention are described with reference to block diagrams and/or operational illustrations of methods and communication terminals. In this regard, each block may represent a module, segment, or portion of code, which comprises one or more executable instructions for implementing the specified logical function (s). It is to be understood that each block of the block diagrams and/or operational illustrations, and combinations of blocks in the block diagrams and/or operational illustrations, can be implemented by radio frequency, analog and/or digital hardware, and/or program instructions. These program instructions may be provided to a controller, which may include one or more general purpose processors, special purpose processors, ASICs, and/or other programmable data processing apparatus, such that the instructions, which execute via the controller and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium include the following: hard disks, optical storage devices, magnetic storage devices, a portable computer diskette, a random access memory (RAM), a read-only memory (ROM), an erasable programmable read-only memory (EPROM or Flash memory), and a compact disc read-only memory (CD-ROM).

As used herein, a "communication terminal" includes, but is not limited to, a terminal that is configured to receive/transmit communication signals via a wireline connection, such as via a public-switched telephone network (PSTN), digital subscriber line (DSL), digital cable, or another data connection/network, and/or via a wireless interface with, for example, a cellular network, a satellite network, a wireless local area network (WLAN), and/or another communication terminal.

When the communication terminal is configured to communicate over a wireless interface, it is referred to herein as a "wireless communication terminal" or a "wireless terminal" or a "mobile terminal." Examples of wireless terminals include, but are not limited to, a cellular telephone, personal data assistant (PDA), pager, and/or a computer that is configured to communicate data over a wireless communication interface that can include a cellular telephone interface, a Bluetooth interface, a wireless local area network interface (e.g., 802.11), another RF communication interface, and/or an optical/infra-red communication interface.

As used herein, "mobile terminals" may be portable, transportable, installed in a vehicle (aeronautical, maritime, or land-based), or situated and/or configured to operate locally and/or in a distributed fashion at any other location(s) on earth and/or in space.

Figure 1:
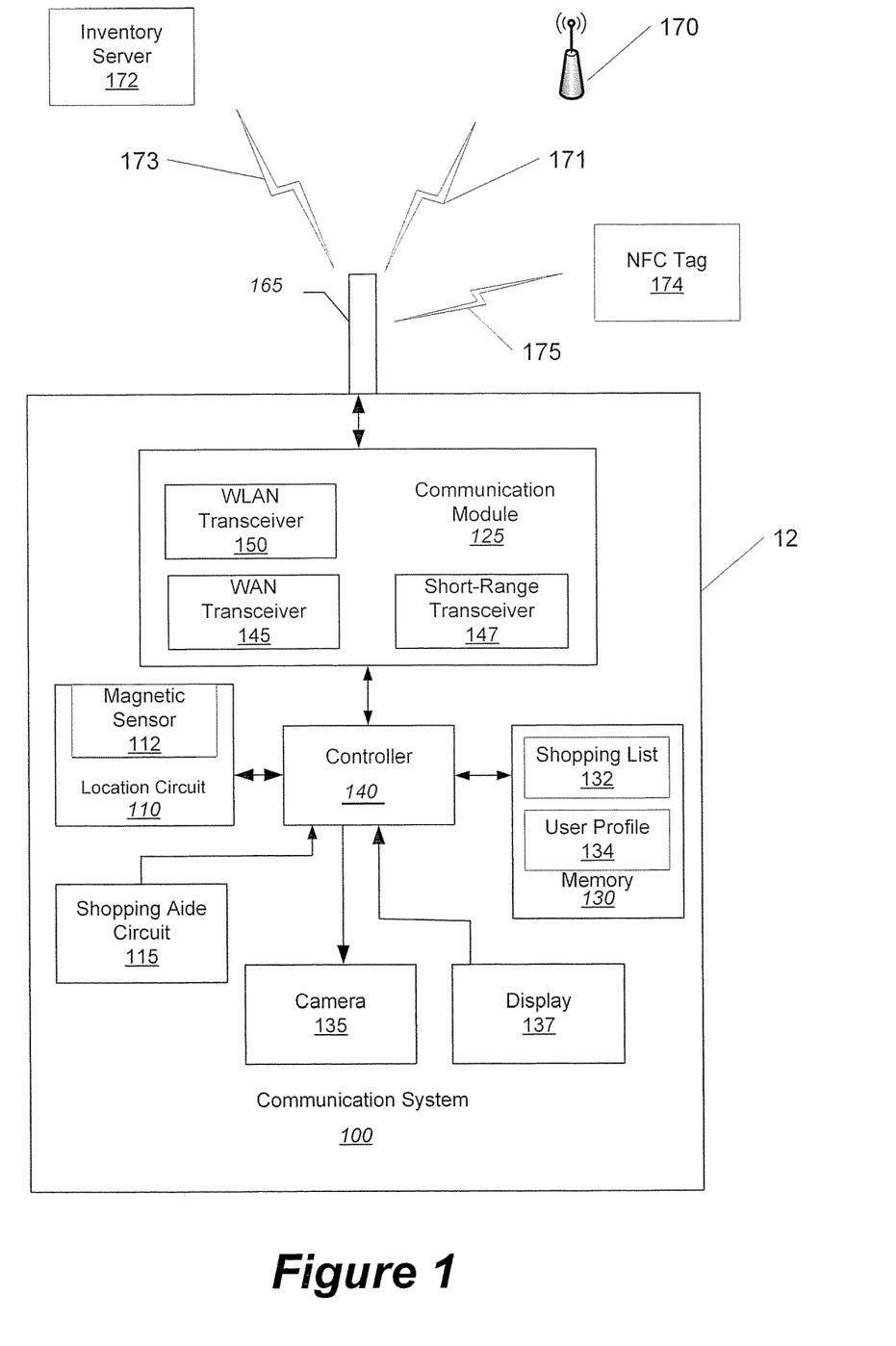
FIG. 1 is a schematic block diagram of a network environment including a wireless mobile terminal configured to provide augmented shopping information according to some embodiments of the present invention.

Some embodiments of the present invention will now be further described below with respect to FIGS. 1-3. Referring now to FIG. 1, a mobile wireless communication terminal 100 in accordance with some embodiments of the present invention is illustrated. The wireless mobile terminal 100 is configured to communicate data with one or more other wireless terminals or other devices over a direct wireless communication interface therebetween; over another wireless communication interface through one or more cellular base stations; and/or over another wireless communication interface through a wireless local area network (WLAN) router, WiMax and/or other wireless network. It will further be understood that, while described for illustrative purposes with reference to wireless communications herein, the present invention is not limited to such embodiments and the communication between a host device and/or user communication devices may be a wired connection and/or a connection including both wired and wireless links supporting, for example, a packetized communication protocol, such as the Interpret Protocol (IP).

The mobile terminal 100 may be a mobile radiotelephone forming a part of a radiotelephone communication system including a base station transceiver 170, which is part of a wireless communications network. In some embodiments of the present invention, the base station transceiver includes the radio transceiver(s) that define an individual cell in a cellular network and communicates with the mobile terminal 100 and other mobile terminals in the cell using a radio-link protocol. It will be understood that, in some embodiments of the present invention, many base station transceivers may be connected through, for example, a mobile switching center and other devices to define the wireless communications network.

The mobile terminal 100 in the illustrated embodiments includes a portable housing assembly 12, a controller 140, a communication module (transceiver) 125, and a memory 130. The mobile terminal 100 further includes user interfaces (i.e., a man machine interface), such as the display 137, and other interfaces, such as a speaker (i.e., a sound transducer) and at least one input device. The foregoing components of the mobile terminal 100 may be included in many conventional mobile terminals and their functionality is generally known to those skilled in the art. The mobile terminal 100 further includes a location module (circuit) 110 and a shopping aide module (circuit) 115, which may be stored in the memory 130.

The display 137 may be any suitable display screen assembly. For example, the display 137 may be a liquid crystal display (LCD) with or without auxiliary lighting (e.g., a lighting panel). In some cases, the mobile terminal 100 may be capable of playing video content of a particular quality. For example, a mobile terminal 100 may be configured to display a video stream having a particular aspect ratio, such as 16:9 or 4:3. A number of standard video formats have been proposed for mobile terminals, including Quarter VGA (QVGA, 320×240 pixels), Common Intermediate Format (CIF, 360×288 pixels) and Quarter Common Intermediate Format (QCIF, 180×144 pixels). Moreover, some mobile terminals may have multiple display screens having different display capabilities. Thus, a mobile terminal 100 may be capable of displaying video in one or more different display formats.

The controller 140 may support various functions of the wireless terminal 100. The controller 140 can be any commercially available or custom microprocessor, for example. In use, the controller 140 of the wireless terminal 100 may generate a display image on the display 137. In some embodiments, however, a separate signal processor and/or video chip (not shown) may be provided in the wireless terminal 100 and may be configured to generate a display image on the display 137.

The memory 34 is configured to store digital information signals and data, including digital media files (e.g., digital audio, image and/or video files).

The communication module 125 illustrated in FIG. 1 is configured to communicate data over one or more wireless interfaces/links, such as wireless links 171, 173 and 175, as discussed herein. As seen in FIG. 1, the communication module 125 can include a cellular or other wide area communication transceiver 145, a short-range or personal-area communication transceiver 147, and/or an 802.11 or other wireless local-area network (WLAN) transceiver 150. Each transceiver may include a transmitter portion and a receiver portion. The communication module 125 transmits outgoing radio frequency signals and receives incoming radio frequency signals, such as voice and data signals, via an antenna 165 to support the links 171, 173, 175. The antenna may be an embedded antenna, a retractable antenna or any antenna known to those having skill in the art without departing from the scope of the present invention.

For a cellular communication, the wireless terminal 100 can communicate via the base station 170 over the link 171 using one or more cellular communication protocols such as, for example, Advanced Mobile Phone Service (AMPS), ANSI-136, Global Standard for Mobile (GSM) communication, General Packet Radio Service (GPRS), Enhanced Data rates for GSM Evolution (EDGE), Code Division Multiple Access (CDMA), Wideband-CDMA (WCDMA), CDMA2000, and Universal Mobile Telecommunications System (UMTS). The cellular base station 170 may be connected to public land-mobile network (PLMN), which, in turn, can be connected to a public switched telephone network (PSTN), a packet-switched data network (e.g., the Internet), and/or another private or public network. Furthermore, Internet Protocol (IP) type data may be routed for transmission over the Internet or world-wide web using existing wired and wireless network components.

The short-range communication transceiver 147 in the communication module 125 may further comprise a short-range radio frequency (RF) communication transceiver or a short-range optical (e.g., infrared) transceiver. The short range RF transceiver may support one or more short-range RF communication protocols, such as Bluetooth and near-field communications (NFC). With respect to Bluetooth, the wireless terminal 100 can communicate via an ad-hoc network through a direct point-to-point interface. Likewise, short-range communications between wireless terminal 100 and NFC tag 174 may be realized using NFC radio 175 when the housing 12 is moved to a position sufficiently close to the NFC tag 174.

Furthermore, the wireless terminal 100 can communicate to a wireless access point (AP) or other such component of a wireless local-area network using the WLAN transceiver 150 of communication module 125. Wireless terminal 100 may use the WLAN transceiver 150, for instance, to communicate over the link 173 to an inventory server 172 using one or more WLAN protocols that may include, but are not limited to, IEEE 802.11a, 802.11b, 802.11e, 802.11g, and/or 802.11i The wireless terminal 100 may also be configured to electrically couple with another terminal via a wireline or cable for the transmission of digital communication signals therebetween. The wireless terminal 100 may include further components, such as a camera 135 configured to generate a still image and/or video data stream based on incident light.

For the illustrated wireless mobile terminal 100, a shopping list 132 is provided in the memory 130 that identifies a plurality of items desired by a user. A user profile is also provided in the memory 130, that may contain various user-specified conditions or criteria that may be used to modify operations in some embodiments as will be further described herein.

For the embodiments illustrated in FIG. 1, the location determination circuit (module) 110 is configured to establish a location, such as a current location, of the mobile terminal 100 in a store. The camera 135 is configured to obtain an image of a view from the location of the mobile terminal 100. The shopping aide circuit (module) 115 is configured to identify at least one of the items on the shopping list 132 having a location within an image obtained from the camera 135. The wireless communication circuit (transceiver) 125 is configured to obtain physical locations of the shopping list items within a store and the shopping aide circuit 115 is configured to identify the shopping list items within the obtained image based on the obtained physical locations of the shopping list items within the store. The shopping aide circuit 115 is further configured to determine one or more position(s) within the image corresponding to the respective obtained physical location(s) of the identified shopping list item(s) and to add one or more graphic indication(s) associated with the identified shopping list item(s) to the obtained image at the respective one or more determined position-(s) within the image to provide an augmented view from the current location.

The display 137 is configured to display the augmented view to the user. The wireless communication circuit 125 may also be configured to obtain supplemental information regarding the shopping list items within the store and the shopping aide circuit 115 may be configured to modify the one or more graphic indication(s) based on the supplemental information.

As such, some embodiments of the present invention allow a user of a cellular phone or other mobile communications device to enhance the user's visual perception of the location of desired items in a retail store or other similar environment. Supplemental information may also be provided, which may give the user some indication of sales or promotions for desired items or reasonable substitutes. Thus, systems, computer program products and methods for enhancing a user's shopping experience by augmenting view(s) of retail store with virtual elements indicating locations of desired items and promotions for same or reasonable substitutes are provided in some embodiments of the present invention.

In other words, in some embodiments, virtual information may be superimposed on a view captured by a video-capable mobile device of a scene in a store or other retail environment. The superimposed virtual information may include information indicating the location within the viewed scene of one or more items of interest to the user, as indicated by a shopping list previously stored by the user either in the mobile device or remotely, information indicating sales or promotions for shopping list items and/or locations and promotions for items that are reasonable substitutes for the shopping list items.

For example, prior to entering the retail store, the user may have stored a shopping list, either within the mobile device or remotely but accessible to the mobile device. The user enters the store and wishes to locate items on the shopping list, but may not be familiar with either the layout of the store or where particular items are located within the layout. In some embodiments, the user proceeds to the first aisle or area of the store and turns on the mobile device's "shopping aide" application, which enables the video camera and viewfinder. The user may also establish a reference point for his location using a variety of approaches. For example, a user may stand on a particular spot indicated on the floor, may register his location by touching a nearby NFC tag containing information indicating its relative location within the store and/or the mobile device may establish the user location from triangulation using the store's WLAN transmitters.

The user's orientation also may be established using any known technique (e.g., magnetic sensor). Likewise, when the user points the camera of the mobile device and captures an image representing a view from the user's location within the store (e.g., down a particular aisle), the image may contain certain elements that uniquely identify that view within the store. The user's view in the store may then be determined, e.g., by a shopping aide application executing on the mobile device and/or in a store server in communication with the mobile terminal, based on a combination of the user's location, orientation, and elements found in the current viewfinder image. The application further determines which of the items on the user's shopping list can be found within that view (e.g. on that aisle), and their approximate location within that view. The application may further indicate sales or promotions for those items, or suggest other reasonable substitutes (and their locations within the view) for which promotions are available. This information is then superimposed on the image seen by the user on the mobile device's display.

Figure 2:
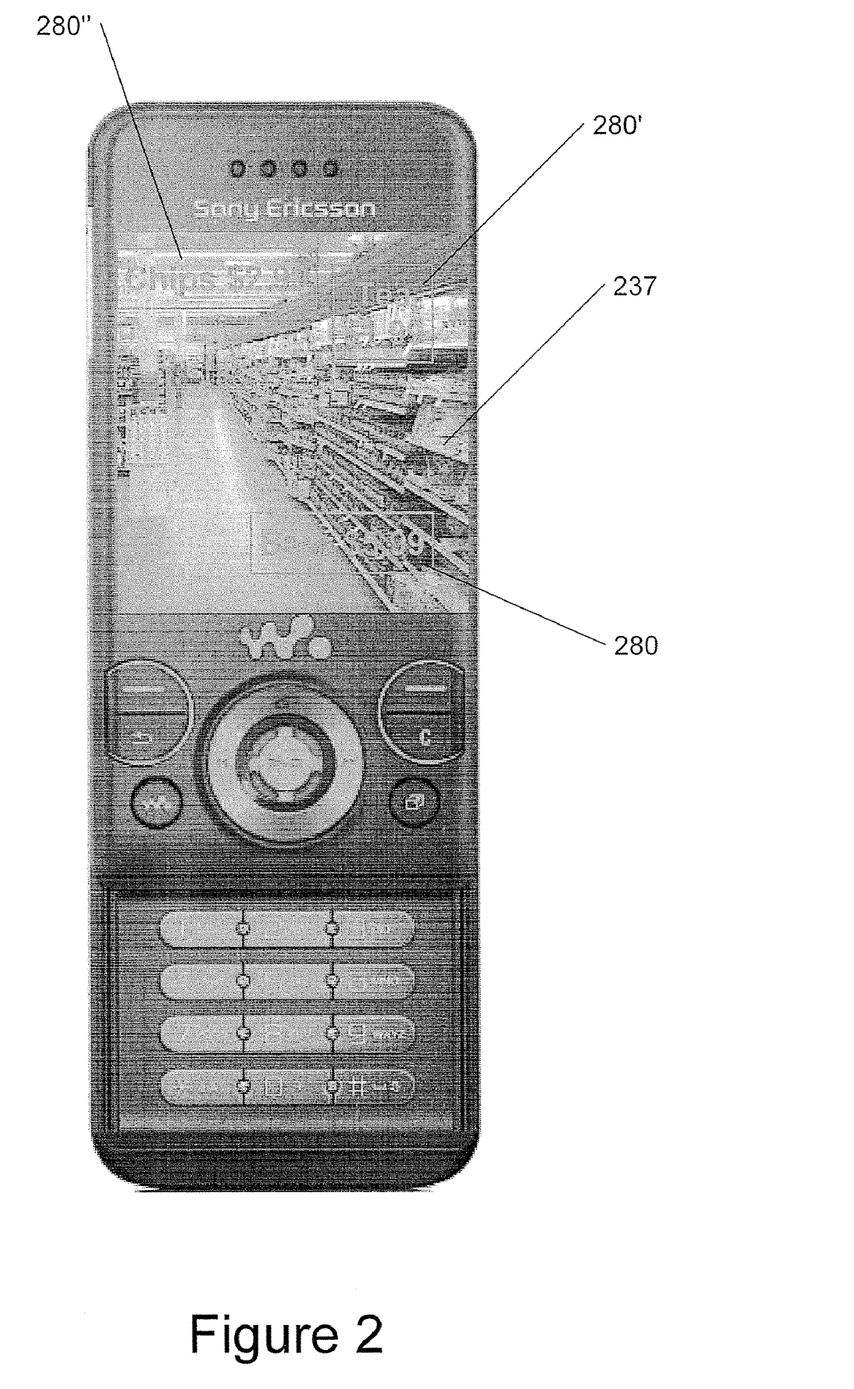
FIG. 2 is a schematic diagram of a mobile terminal displaying an augmented image of a store aisle according to some embodiments of the present invention.
Figure 3:
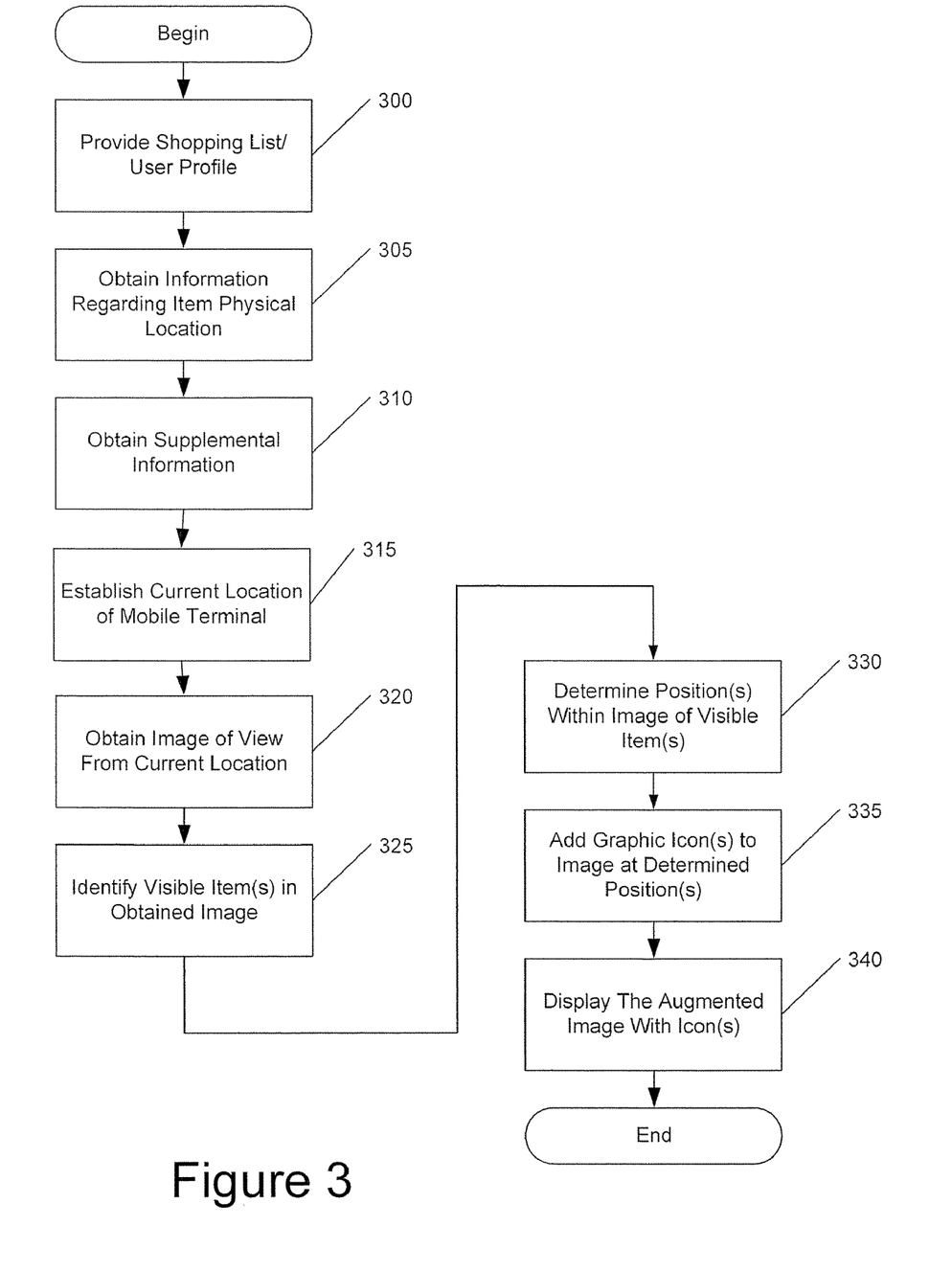
FIG. 3 is a flowchart illustrating methods for providing augmented shopping information according to some embodiments of the present invention.

FIG. 2 illustrates a mobile terminal including an example of such an augmented image. As seen in FIG. 2, a display 237 of the mobile terminal includes an augmented view of an aisle of a grocery store. Three graphic indications 280, 280', 280" are imposed on the image in the display 237 at positions on the display 237 corresponding to physical locations of items associated with the graphic indications 280, 280', 280". The graphic indications 280, 280', 280" include supplemental information, including the price of the items.

In some embodiments, the user may also get an overhead view of the layout of the store by, for example, tilting the mobile device so that the display is parallel to the ground and/or the camera is pointing at the ground while the shopping aide application is enabled. This view may be displayed automatically based on the sensing of the change in orientation of the device. The location(s) of the item(s) on the shopping list may be displayed on this overhead view, along with promotions or other information as described above.

In further embodiments of the invention, the user may be presented with a menu to choose particular items for which to limit the display of virtual information. For instance, the user may know where most of the desired items are located and only wish to employ the shopping aide for one particular item. In such case, the user may select this item from a list and any subsequent searches may be limited to this particular item. The particularized customization of the image augmentation in some embodiments may be provided based on a user profile associated with the user.

A method for provided augmented shopping information to a user of a mobile terminal in a store will now be further described with reference to the embodiments of the present invention illustrated in the flow chart diagram of FIG. 3. As shown in the embodiments of FIG. 3, operations begin at block 300 by providing a shopping list identifying a plurality of items. For example, the shopping list may be a grocery shopping list for use by the user at a grocery store. Information regarding the physical locations of one or more of the items on the shopping list in the store is obtained (block 305).

In some embodiments, in addition to obtaining the physical locations at block 305, supplemental information regarding the items in the store may also be obtained (block 310). For example, the supplemental information may include pricing information associated with respective items. A current location of the mobile terminal in the store is also established (block 315).

In some embodiments, establishing the location at block 315 may include receiving an input from the user designating the location and/or receiving data from a wireless transmitter having a known physical location within the store, such as an NFC tag. In other embodiments, the wireless transmitter having a known physical location may include a plurality of WLAN transmitters that may be used to establish the location at block 315 using triangulation based on the signals received from the plurality of WLAN transmitters. Operations at block 315 may further include establishing an orientation of the mobile terminal, for example, based on a magnetic sensor located within the mobile terminal, such as the magnetic sensor 112 shown in the embodiments of FIG. 1.

Other approaches to establishing the location at block 315 in some embodiments of the present invention include receiving a user input designating a currently obtained image as the view from the location of the mobile terminal. One or more elements in the obtained image are detected and the location is established based on the detected elements. Such an approach to establishing a location that combines image analysis to detect identifiable elements with knowledge of the corresponding locations of the detected elements may be carried out by the mobile terminal, by one or more servers or other network components associated with the store in which the mobile terminal is located, or by a combination of the mobile terminal and one or more network components.

An image of a view is obtained from the location (block 320). The obtained image may be a video image. As such, operations for obtaining an image at block 320 may include obtaining a sequence of images to provide the video image of the view.

One or more of the items in the shopping list having an associated location in the obtained image are identified at block 325 based on the physical locations of items obtained at block 305. For example, the item may be visible in the obtained image or may be behind an item or feature visible in the obtained image. One or more positions within the image corresponding to the respective physical location(s) of the identified item(s) are determined (block 330). A graphic indication of the identified item(s) is added to the obtained image at the determined position(s) within the image to provide an augmented image of the view (block 335). The graphic indication/icon added at block 335 may be determined based on supplemental information obtained at block 310. In other words, the graphic indication may be modified based on supplemental information. For example, the supplemental information may include pricing information associated with respective items and the graphic indication may be modified to include the pricing information for the items in the graphic indication itself. By way of further example, substitute items may be identified in the supplemental information at block 310 and a location within an image for ones of such substitutes may be determined and a graphic indication of the location of the identified substitute item and indication of what the substitute item replaces for may be included in the augmented image at the appropriate position within the image.

The image representing the augmented view from the location is then displayed to the user on the display of the mobile terminal (block 340). It will be understood that, for video images, operations may repeat at blocks 325-340 for each of the sequence of images or may be updated responsive to detecting a change in the view from the location rather than being repeated continuously where the image is not changing between the sequence of image incidences.

Operations for obtaining information at block 305 may include establishing a communication connection between the mobile terminal and a store inventory server. For example, the mobile terminal 100 in FIG. 1 may communicate with the inventory server 172 to establish a communication connection and then provide the shopping list 132 from the mobile terminal 100 to the inventory server 172 using the established communication connection 173. The information may then be obtained from the store inventory server 172 responsive to providing the shopping list the store inventory server 172 over the communication connection (link) 173.

As also noted above, user profiles may be utilized to assist in various of the operations described with reference to FIG. 3 in some embodiments of the present invention. In particular, different user profiles may be provided for different stores, for example, stores frequented by the user so that the user may have a pre-established initial location that is determined based upon a user key entry once a user activates the respective user profile. In other words, establishing the location may be based on the user profile at block 315. Furthermore, operations related to obtaining supplemental information at block 310 may likewise be based on information in the stored associated user profile for the user. Similarly, operations related to the generation of the one or more graphic indications or items selected to be included in the one or more graphic indications may be based on associated user profile.

As previously discussed, it will also be understood that, in some embodiments, additional capabilities may be provided. For example, a change in the orientation of the mobile terminal to a specified orientation may be detected. In response, an overhead view of a layout of the store may be displayed on the display of the mobile terminal based on the detected orientation. The overhead view may be augmented with graphic indications of item locations.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed is:

1. A method for providing augmented shopping information to a user of a mobile terminal in a store, comprising:
   providing a shopping list identifying a plurality of items;
   obtaining information regarding physical locations of respective ones of the items in the store;
   establishing a location of the mobile terminal in the store;
   obtaining an image of a view from the location, wherein a perspective of the view is defined by the user pointing a camera in the mobile terminal used to obtain the image and represents a view from the user's location in the store;
   identifying at least one of the items having an associated location in the obtained image based on the obtained information regarding physical locations;
   determining a position within the image corresponding to the respective physical location of the identified at least one of the items;
   adding a graphic indication of the identified at least one of the items to the obtained image at the determined position within the image to provide an augmented image of the view; and
   displaying the augmented image of the view to the user on a display of the mobile terminal.

2. The method of claim 1, wherein establishing the location comprises receiving an input from the user designating the location and/or receiving data from a known physical location wireless transmitter within the store.

3. The method of claim 2, wherein establishing the location includes receiving the data from the known physical location wireless transmitter within the store and wherein the known physical location wireless transmitter comprises a near field communication transmitter.

4. The method of claim 2, wherein establishing the location includes receiving the data from the known physical location wireless transmitter within the store and wherein the known physical location wireless transmitter comprises a plurality of wireless local area network transmitters and establishing the location includes determining the location based on triangulation using signals received from the plurality of wireless local area network transmitters.

5. The method of claim 2, wherein establishing the location includes establishing an orientation of the mobile terminal based on a magnetic sensor within the mobile terminal, wherein the orientation corresponds to a direction in which the mobile terminal is aligned as determined by the magnetic sensor in the mobile terminal.

6. The method of claim 1, wherein establishing the location comprises receiving an input from the user designating the location, wherein the input comprises designation of the obtained image as the view from the location and wherein establishing the location comprises:
   detecting an element in the obtained image; and
   establishing the location based on the detected element.

7. The method of claim 1, wherein the image comprises a video image and obtaining the image includes obtaining a sequence of images to provide the video image and wherein identifying at least one of the items having an associated location in the obtained image, determining the position within the image, adding the graphic indication and displaying the augmented image are repeatedly performed for respective ones of the sequence of images responsive to detecting a change in the view from the location.

8. The method of claim 1, wherein obtaining information further comprises obtaining supplemental information regarding the respective ones of the items in the store and wherein adding the graphic indication includes modifying the graphic indication based on the supplemental information.

9. The method of claim 8, wherein the supplemental information includes pricing information associated with the respective items and wherein modifying the graphic indication includes including the pricing information in the graphic indication.

10. The method of claim 1, wherein obtaining information further comprises obtaining an identification and physical location of a substitute item for at least one of the items that has an associated location in the obtained image and wherein the method further comprises including a graphic indication of the identified substitute item in the augmented image at a position in the image corresponding to the physical location of the substitute item.

11. The method of claim 1, wherein obtaining information regarding physical locations comprises:
   establishing a communication connection between the mobile terminal and a store inventory server;
   providing the shopping list to the store inventory server using the established communication connection; and
   obtaining the information from the store inventory server responsive to providing the shopping list to the store inventory server.

12. The method of claim 1, further comprising providing a user profile for the store for the user and wherein establishing a location comprises establishing the location based on the user profile.

13. The method of claim 12, wherein obtaining information further comprises obtaining supplemental information regarding the respective ones of the items in the store based on the user profile.

14. The method of claim 1, further comprising:
   detecting a change in orientation of the mobile terminal to a specified orientation, wherein the change in orientation corresponds to a change in an alignment direction of the mobile terminal; and
   displaying an overhead view of a layout of the store on the display of the mobile terminal responsive to detection of the change in orientation of the mobile terminal.

15. The method of claim 1, wherein displaying the augmented image is preceded by obtaining a selection from the user of a subset of the items and adding a graphic indication comprises adding a graphic indication only for ones of the selected subset of the items having an associated location in the obtained image.

16. The method of claim 1, wherein the camera is in the mobile terminal.

17. A wireless mobile terminal configured to perform operations comprising:
   providing a shopping list identifying a plurality of items;
   obtaining information regarding physical locations of respective ones of the items in the store;
   establishing a location of the mobile terminal in the store;
   obtaining, using a camera, an image of a view from the location, wherein a perspective of the view is defined by the user pointing the camera in the mobile terminal used to obtain the image and represents a view from the user's location in the store;

identifying at least one of the items having an associated location in the obtained image based on the obtained information regarding physical locations;

determining a position within the image corresponding to the respective physical location of the identified at least one of the items;

adding a graphic indication of the identified at least one of the items to the obtained image at the determined position within the image to provide an augmented image of the view; and displaying the augmented image of the view to the user on a display of the mobile terminal.

18. A computer program product for providing augmented shopping information to a user of a mobile terminal in a store, the computer program product comprising computer program code embodied in a computer readable medium, the computer program code comprising:

program code configured to provide a shopping list identifying a plurality of items;

program code configured to obtain information regarding physical locations of respective ones of the items in the store;

program code configured to establish a location of the mobile terminal in the store;

program code configured to obtain, using a camera, an image of a view from the location, wherein a perspective of the view is defined by the user pointing the camera in the mobile terminal used to obtain the image and represents a view from the user's location in the store;

program code configured to identify at least one of the items having an associated location in the obtained image based on the obtained information regarding physical locations;

program code configured to determine a position within the image corresponding to the respective physical location of the identified at least one of the items;

program code configured to add a graphic indication of the identified at least one of the items to the obtained image at the determined position within the image to provide an augmented image of the view; and program code configured to display the augmented image of the view to the user on a display of the mobile terminal.

19. A wireless mobile terminal, comprising:

a shopping list identifying a plurality of items desired by a user;

a wireless communication circuit configured to obtain information regarding physical locations of items in a store;

a camera configured to capture an image representing a view from a user's location in the store;

a location determination module configured to establish a location of the mobile terminal in the store;

a shopping aide module configured to identifying at least one of the items on the shopping list having an associated location in the obtained image based on the obtained information regarding physical locations, to determine a position within the image corresponding to the respective physical location of the identified at least one of the items and to add a graphic indication of the identified at least one of the items to the obtained image at the determined position within the image to provide an augmented image of the view; and a display configured to display the augmented image of the view to the user.

20. The wireless mobile terminal of claim 19, wherein the wireless communication circuit is further configured to obtain supplemental information regarding the items in the store and wherein the shopping aide module is further configured to modify the graphic indication based on the supplemental information.

21. The wireless mobile terminal of claim 19, further comprising a housing and wherein the wireless communication circuit, the camera, the location determination module and the shopping aide module are positioned in the housing and wherein the display is coupled to the housing.

* * * * *

UNITED STATES PATENT AND TRADEMARK OFFICE
CERTIFICATE OF CORRECTION

PATENT NO. : 7,707,073 B2  Page 1 of 1
APPLICATION NO. : 12/121034
DATED : April 27, 2010
INVENTOR(S) : Bloebaum et al.

It is certified that error appears in the above-identified patent and that said Letters Patent is hereby corrected as shown below:

Column 7, Line 35: Please correct "profile is" to read -- profile 134 is --

Signed and Sealed this

Twenty-first Day of September, 2010

David J. Kappos
*Director of the United States Patent and Trademark Office*